US012689457B2

(12) United States Patent
 Oxenløwe et al.

(10) Patent No.: US 12,689,457 B2
(45) Date of Patent: Jul. 21, 2026

(54) SPATIALLY DISTRIBUTED OPTICAL FIBRE BASED TRANSMISSION LINK AND METHOD THEREOF

(71) Applicant: Danmarks Tekniske Universitet, Kongens Lyngby (DK)

(72) Inventors: Leif Katsuo Oxenløwe, Kongens Lyngby (DK); Michael Galili, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 296 days.

(21) Appl. No.: 18/286,024

(22) PCT Filed: Apr. 8, 2022

(86) PCT No.: PCT/EP2022/059427
 § 371 (c)(1),
 (2) Date: Oct. 6, 2023

(87) PCT Pub. No.: WO2022/214656
 PCT Pub. Date: Oct. 13, 2022

(65) Prior Publication Data
 US 2024/0388363 A1 Nov. 21, 2024

(30) Foreign Application Priority Data
 Apr. 8, 2021 (EP) .................................... 21167392

(51) Int. Cl.
 *H04B 10/00* (2013.01)
 *H04B 10/079* (2013.01)
 (Continued)

(52) U.S. Cl.
 CPC ........ *H04J 14/02* (2013.01); *H04B 10/07953* (2013.01); *H04B 10/25* (2013.01); *H04B 10/2939* (2013.01)

(58) Field of Classification Search
 CPC ... H04J 14/02; H04B 10/07953; H04B 10/25; H04B 10/2939
 See application file for complete search history.

(56) References Cited

U.S. PATENT DOCUMENTS

| | | | |
|---|---|---|---|
| 6,654,561 B1 * | 11/2003 | Terahara .......... | H04B 10/07953 398/25 |
| 10,135,221 B2 * | 11/2018 | Sun ................... | H01S 3/094049 |

(Continued)

FOREIGN PATENT DOCUMENTS

| | | |
|---|---|---|
| EP | 0539267 A1 | 4/1993 |
| EP | 0582406 | 2/1994 |

(Continued)

OTHER PUBLICATIONS

Dar et al., Cost-Optimized Submarine Cables Using Massive Spatial Parallelism, Sep. 18, 2018, 11 pgs.

(Continued)

*Primary Examiner* — Agustin Bello
(74) *Attorney, Agent, or Firm* — Cesari and McKenna, LLP

(57) ABSTRACT

Disclosed is a method for optimizing optical fibre based transmission, in particular increasing span length and/or minimizing energy consumption and cost for an optical fibre based transmission link, and the so optimized fibre based transmission link. Further disclosed is a method for minimizing the energy consumption and/or the cost of an optical fibre based transmission link by doubling the number of fibre channels. Also disclosed is a method for minimizing the energy consumption and/or the cost of a repeaterless optical fibre based transmission link.

10 Claims, 4 Drawing Sheets

(51) Int. Cl.
    *H04B 10/25*     (2013.01)
    *H04B 10/293*     (2013.01)
    *H04J 14/02*     (2006.01)

(56)           References Cited

U.S. PATENT DOCUMENTS

| | | | | |
|---|---|---|---|---|
| 10,587,339 | B1 * | 3/2020 | Al Sayeed | H04B 10/70 |
| 12,034,487 | B2 * | 7/2024 | Sakamoto | H04J 14/052 |
| 12,063,165 | B2 * | 8/2024 | Alvizu Gomez | H04L 45/125 |
| 12,323,340 | B2 * | 6/2025 | Alvizu Gomez | H04L 47/805 |
| 2008/0050121 | A1 | 2/2008 | Evangelides et al. | |
| 2012/0207470 | A1 * | 8/2012 | Djordjevic | H04J 14/0201 |
| | | | | 398/44 |
| 2012/0224861 | A1 * | 9/2012 | Winzer | H04B 10/2581 |
| | | | | 398/143 |
| 2015/0078744 | A1 * | 3/2015 | Ito | H04J 14/052 |
| | | | | 398/43 |
| 2015/0333864 | A1 * | 11/2015 | Swinkels | H04B 10/0795 |
| | | | | 398/79 |
| 2016/0072587 | A1 * | 3/2016 | Pilipetskii | H04J 14/052 |
| | | | | 398/79 |
| 2018/0128967 | A1 * | 5/2018 | Zhu | G02B 6/036 |
| 2020/0076501 | A1 * | 3/2020 | Searcy | H04B 10/0731 |
| 2020/0381888 | A1 * | 12/2020 | Mizuno | H01S 3/302 |
| 2022/0109509 | A1 * | 4/2022 | Tibuleac | H04B 10/2939 |
| 2022/0236622 | A1 * | 7/2022 | Umeki | G02F 1/377 |
| 2023/0236473 | A1 * | 7/2023 | Kazama | H01S 3/0092 |
| | | | | 359/330 |
| 2024/0388363 | A1 * | 11/2024 | Oxenløwe | H04B 10/25 |

FOREIGN PATENT DOCUMENTS

| | | | |
|---|---|---|---|
| EP | 1054521 | A1 | 11/2000 |
| EP | 1221776 | A1 | 7/2002 |
| EP | 3512124 | A1 | 7/2009 |
| EP | 3192193 | A1 | 3/2016 |
| JP | 2003110502 | A2 | 4/2003 |
| JP | 2015133604 | A2 | 7/2015 |
| WO | WO-05094321 | A3 | 10/2005 |
| WO | WO-06069136 | A2 | 6/2006 |
| WO | WO-2016040086 | A1 | 3/2016 |

OTHER PUBLICATIONS

Cai et al., Optic Transmission System, Science Direct, Rongqing Hui, in Introduction to Fiber-Optic Communications, 2020, 21 pages.

Sinkin et al, SDM for PowerEfficient Undersea Transmission, 2018, 2 pages.

Ibrahimi et al.: "Minimum-Cost Optical Amplifier Placement in Metro Networks", Journal of Lightwave Technlogy, IEEE, USA, vol. 38, No. 12, Apr. 29, 2020, pp. 3221-3228, 8 pgs.

Youssef et al.: "traffic-Driven vs. Topology-Driven Strategies for Regeneration Sites Placement", Communications (ICC), 2010, IEEE International Conference On, IEEE, Piscataway, NJ, USA, May 23, 2010, pp. 1-6 ISBN: 978-1-4244-6402-9.

\* cited by examiner

100

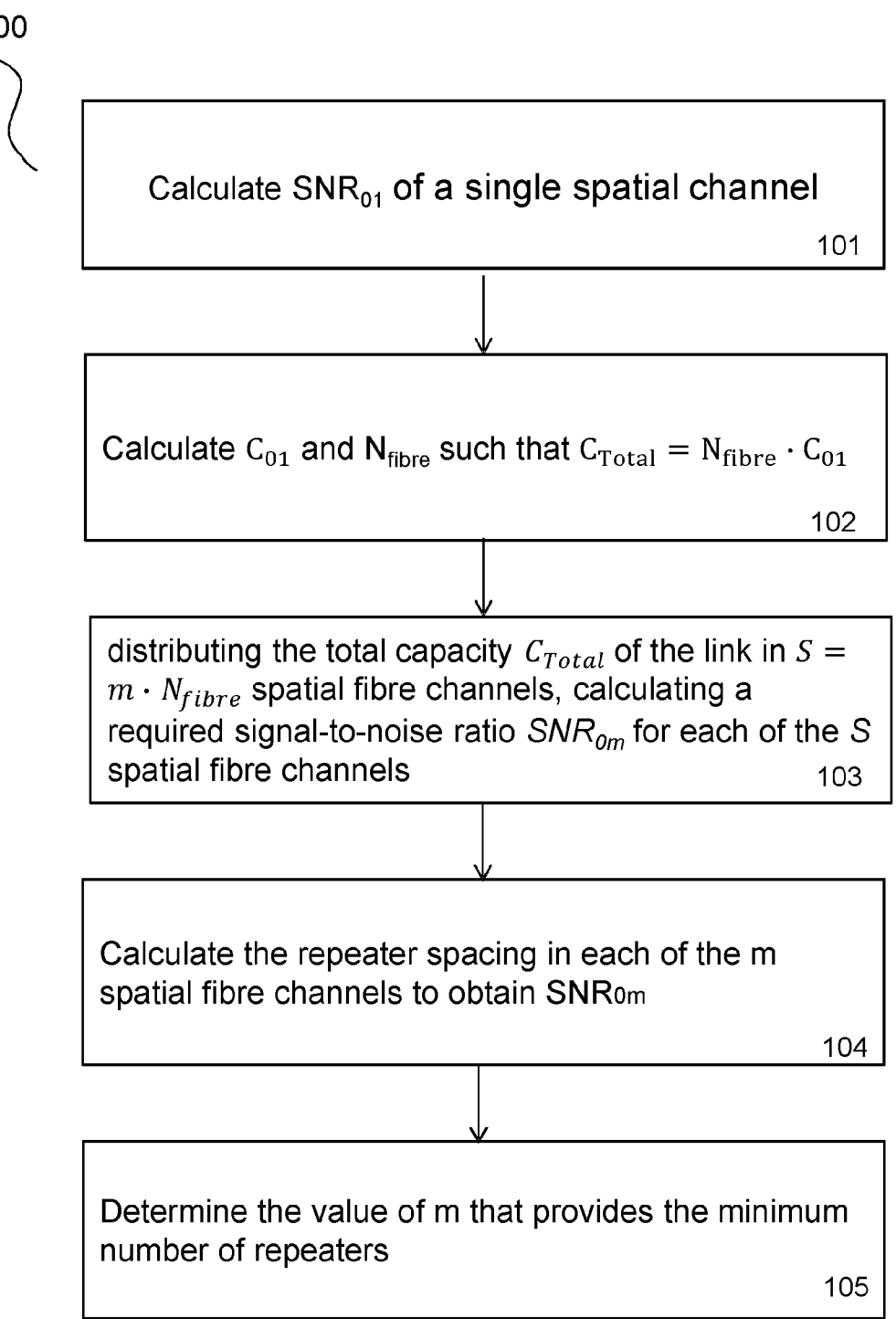

Calculate $SNR_{01}$ of a single spatial channel

101

Calculate $C_{01}$ and $N_{fibre}$ such that $C_{Total} = N_{fibre} \cdot C_{01}$

102 distributing the total capacity $C_{Total}$ of the link in $S = m \cdot N_{fibre}$ spatial fibre channels, calculating a required signal-to-noise ratio $SNR_{0m}$ for each of the $S$ spatial fibre channels

103

Calculate the repeater spacing in each of the m spatial fibre channels to obtain $SNR_{0m}$

104

Determine the value of m that provides the minimum number of repeaters

$SNR_{0m}$     $SNR_{01}$ $OCNR_{laser}$ $P_{launch}$ $x\ K_{link}$ $G_{link}$ $P_{launch}$
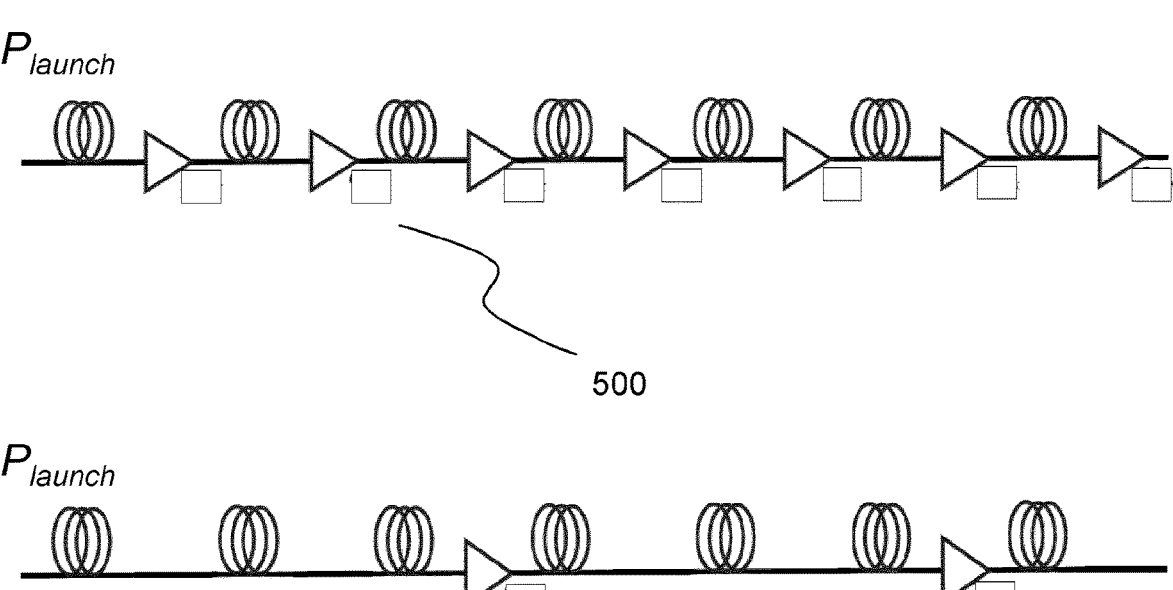
500
$P_{launch}$
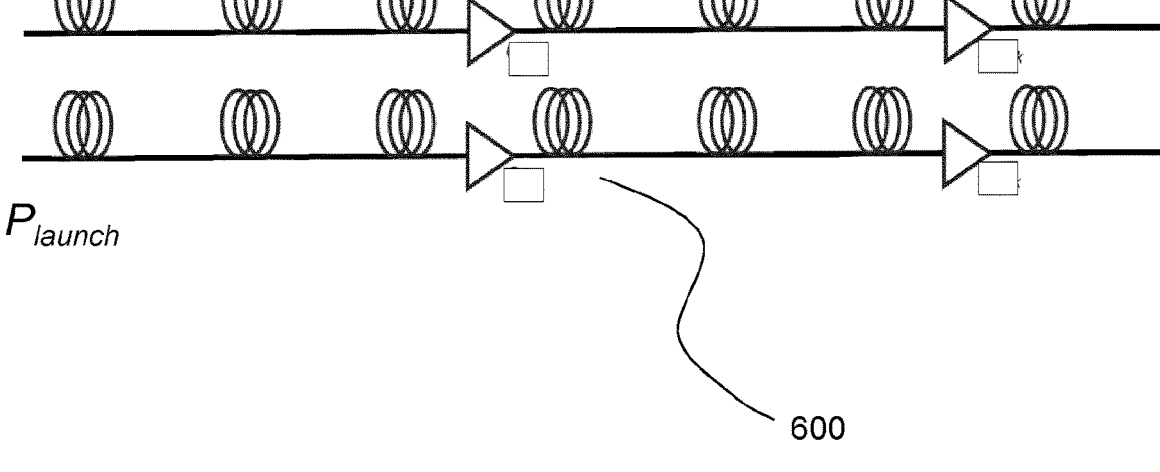
$P_{launch}$
600
FIG. 4

SPATIALLY DISTRIBUTED OPTICAL FIBRE BASED TRANSMISSION LINK AND METHOD THEREOF

CROSS REFERENCE TO RELATED APPLICATIONS

This application is the National Stage under 35 U.S.C. § 371 of International Application No. PCT/EP2022/059427, filed Apr. 8, 2022, which claims the benefit of European Patent Application No. 21167392.6 filed on Apr. 8, 2021. The contents of both applications are hereby incorporated by reference herein in their entirety.

The present disclosure relates to a method for optimizing optical fibre based transmission, in particular increase span length and/or minimizing energy consumption and cost for an optical fibre based transmission link, and the so optimized fibre based transmission link.

BACKGROUND

Optical fibre technology are widely used in many applications within communication systems and are the backbone of the internet. Today, there are more than 5 billion kilometres of fibre installed around the globe connecting continents, countries, regions, cities, buildings, antennas, etc. The optical fibre success owes to its low transmission loss and high bandwidth.

However a fibre is not lossless and the data-carrying light travelling through the fibre needs to be optically amplified by repeaters, containing amplifiers, typically erbium-doped fibre amplifiers (EDFA), or repeaters of other kind. EDFAs are made by doping a length of fibre with the rare-earth mineral erbium and pumping it with light from a laser. Optimization of the EDFA is under continuous study and research.

Optical fibre is widely used for undersea communications. Trans-pacific links are about 14.000 km long. Trans-Atlantic links are about 7.000 km long. Other submarine lines are about 3.000 km long. Regional submarine links are in the range of hundreds of kilometres. Trans-oceanic links, such as trans-Pacific and trans-Atlantic, are particularly troublesome, as all the power needed for amplification during the link must come from the shores.

SUMMARY

In the past years, it has become apparent that communication networks use a considerable fraction of the world's total electricity. Therefore there is a need for finding ways and systems capable of reducing the energy consumption. It is also desirable to obtain, at the same time, a reduction of the cost. Reducing the power consumption and the cost of an optical fibre based transmission link is very important, especially in submarine optical fibre transmission links.

In optical fibre based transmission links, repeaters are typically a huge source of both power consumption and cost, as they consume large amount of power and they are also very costly. Finding ways to minimize and/or optimizing the number of amplifiers is within the scope of the present application. The inventors have realized that, by adding a certain number of fibres, for example increasing the number of fibres with a factor m, the number of repeaters may be decreased and minimized by keeping a same capacity of the transmission link. In addition, the presently disclosed methodology may be used to increase the reach of repeaterless links.

In a first embodiment the present disclosure relates to a method for minimizing the energy consumption, the number of repeaters, and/or the cost of an optical fibre based transmission link characterized by having an optical signal-to-noise-ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has only one optical fibre;

calculating the corresponding capacity $C_{01}$ of the single spatial channel, determined by the $SNR_{01}$, and calculating a number of single spatial channels ($N_{fibre}$) required in the link to obtain a predefined desired total capacity $C_{Total} = N_{fibre} \cdot C_{01}$;

whilst maintaining the same total capacity of the link, distributing the total capacity $C_{Total}$ of the link in $S = m \cdot N_{fibre}$ spatial fibre channels, calculating a required signal-to-noise ratio $SNR_{0m}$ for each of the S spatial fibre channels to support the capacity $C_{Total}/S$, where m is between 1 and 2, or 2, or greater than 2, and wherein S is an integer;

for each fibre calculating a required repeater spacing, or an obtainable link length (reach), in each spatial fibre channel to obtain the required $SNR_{0m}$; and determining the number of m that provides the minimum number of repeaters or selecting m to provide an optimum balance between repeaterless distance and number of spatial fibre channels S.

In the present disclosure it has to be understood that the number spatial fibre channels obtained by the presently disclosed method may be $S = m \cdot N_{fibre}$, wherein S is an integer number as it corresponds to the number of spatial fibre channels, whereas m may be a fractional number, and $N_{fibre}$ (number of single spatial channels) may be an integer number. For example $N_{fibre}$ may be equal to 4, S may be equal to 6 and m may be equal to $6/4 = 1.5$. In another example, $N_{fibre}$ may be equal to 10, and S may be equal to 12, therefore m may be equal to $12/10 = 1.2$ he presently disclosed approach can be applied to a transmission link with repeaters or a repeaterless transmission link. When applied to transmission links with repeaters, the presently disclosed method can reduce/minimize the number of repeaters, thereby reduce power consumption and cost, typically both cost of installation and running costs. When applied to repeaterless transmission links, the presently disclosed method may increase the length of the repeaterless distance, and therefore generate the opportunity to cover larger distances with repeaterless links, avoiding therefore the need for usage of power hungry and costly amplifiers.

The present disclosure further relates to a method for minimizing the energy consumption and/or the cost of an optical fibre based transmission link characterized by having an optical signal-to-noise-ratio (OSNR) and desired total capacity $C_{Total}$, the method comprising the steps of: calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre; calculating the corresponding capacity $C_{01}$ of the single spatial channel, determined by the $SNR_{01}$, and calculating a number of single spatial channels ($N_{fibre}$) required in the link to obtain a predefined desired total capacity approach achieves energy and/or cost reduction and optimization by reducing and minimizing the total number of repeaters on the optical fibre based transmission links, by maximizing the total length of a repeaterless optical fibre based transmission link, and/or by balancing the number of spatial fibre channels taking into account also the energy consumption and the cost of the transceivers.

In both the case of a repeaterless link or in the case of a link with repeaters, the length of the repeaterless span, or repeaterless distance may be increased.

Each of the two or multiple spatial fibre channels may be independent from each other in such a way that there is no cross-talk from any one of the 2 or m spatial fibre channels to any of the other spatial fibre channels and the total capacity of the 2 or m independent spatial fibre channels may be the sum of the capacities of each of the 2 or m independent spatial fibre channels.

The capacity $C_{Total}$ of the fibre based transmission link with multiple or 2 spatial fibre channels may be the same as the capacity $C_{Total}$ of the fibre based transmission link with one spatial fibre channel, which has not been optimized using the methods presently disclosed.

The inventors have surprisingly realized that the optimum value for m is often found for m=2 (where m is the number of spatial fibre channels) for a fibre based transmission link with repeaters. For a fibre based transmission link with repeaters, it may be enough to utilize two spatial fibre channels to minimize the number of repeaters, whereas, for a repeaterless optical fibre based transmission link, the maximization of the length may be giving a small incremental advantage also for values of m greater than 2, where m is the number of spatial fibre channels. In addition, the optimum for the energy consumption and cost saving, may be for m=2 even for repeaterless optical fibre based transmission link, taking into account the energy consumption and cost of the transceivers.

Each spatial fibre channel may implement any of wavelength division multiplexing (WDM) or spatial division multiplexing (SDM), or other multiplexing techniques, or no multiplexing technique.

The present disclosure furthermore relates to an optical fibre based transmission link, wherein the total number of repeaters, and therefore the energy consumption and the cost, of the optimized fibre based transmission link with two or several spatial fibre channels may be less than the total number of repeaters, energy and cost of the fibre based transmission link with one spatial fibre channel.

In addition, the present disclosure relates to a repeaterless optical fibre based transmission link, wherein the length of the repeaterless span of the fibre based transmission link with 2 or several spatial fibre channels is larger than the repeaterless span of the optical fibre based transmission link with one spatial fibre channel.

When designing an optical transmission system there a number of fixed parameters and a number of free parameters, and some or all of the free parameters are varied in an attempt to optimize the transmission system. The target of the optimization depends of the situation and application. As also described above the presently disclosed approach of distributing capacity into additional fibers can be used to reduce energy, cost and number of repeaters, and also to increase link length of systems without repeaters. In these examples the total desired capacity was fixed, because this is often the target of system vendors. However, the presently disclosed approach may for example also be used to increase and/or maximize capacity of a link, i.e. in case there is a certain fixed power budget, the presently disclosed approach can be used to maximize capacity of the link based on the fixed power budget for a certain link length. The presently disclosed approach can also be used increase the reach of repeatered systems, e.g. for a fixed power budget. A fixed power budget typically scales with the number of repeaters, i.e. the number of repeaters can be a fixed parameter in the optimization. The inventors have realized that, according to the presently disclosed methodology, the distance between repeaters may be increased by accepting a lower signal-to-noise ratio on a single spatial channel and that capacity may be recovered by using a multiple spatial channel, that is a channel with number of fibre or fibre pairs increased by a factor m. A desirable value of m can then be determined using the methodology described herein, depending on system requirements, for example on capacity.

Hence, a further embodiment relates to a method for increasing and/or maximizing capacity of an optical fibre based transmission link characterized by an optical signal-to-noise-ratio (OSNR) and having a number of repeaters the method comprising the steps of: maximizing capacity of an optical fibre based transmission link characterized by an optical signal-to-noise-ratio (OSNR) and having a number of repeaters the method comprising the steps of:

calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has only one optical fibre;

calculating the corresponding capacity $C_{01}=B\cdot\log_2(1+SNR_{01})$ of the single spatial channel, determined by the $SNR_{01}$ and a total capacity $C_{Total}=N_{fibre}\cdot C_{01}$ where $N_{fibre}$ is the number of single spatial channels;

increase the number of optical fibres to $S=m\cdot N_{fibre}$ where S is an integer and m is a number more than 1, such that a repeater spacing $L_{EDFA1}$ of the single spatial channel is related to a repeater spacing $L_{EDFAm}$ of a $S=m\cdot N_{fibre}$ spatial fibre channel, by the following equation:

$$\frac{L_{EDFAm}}{L_{EDFA_1}} \geq m,$$

and such that a signal to noise ratio of the S spatial fibre channels $SNR_{0m}$ is lower than a signal to noise ratio $SNR_{01}$ of the single spatial channel;

thereby obtaining an increased capacity $C_{increased}=N_{fibre}\cdot m\cdot B\cdot\log_2(1+SNR_{0m})$. Hence, the increased capacity may depend on m to a stronger degree than on $SNR_{0m}$, by an increased number of fibres S and keeping the number of repeaters to a same or lower value.

In this disclosure, the span or repeaterless span, is the repeaterless spacing or the repeaterless distance between two repeaters or the repeaterless length of a repeaterless optical fibre based transmission link.

DESCRIPTION OF THE DRAWINGS

The present disclosure will in the following be described in greater detail with reference to the accompanying drawings:

FIG. 1 a schematic view of one embodiment of the disclosed methods.

FIG. 4 an embodiment of a non-optimum optical fibre based transmission link with repeaters with one spatial fibre channel, or single spatial channel (500), and an embodiment of an optimum optical fibre based transmission link with repeaters with two spatial fibre channels (600).

DETAILED DESCRIPTION

Figure 2:
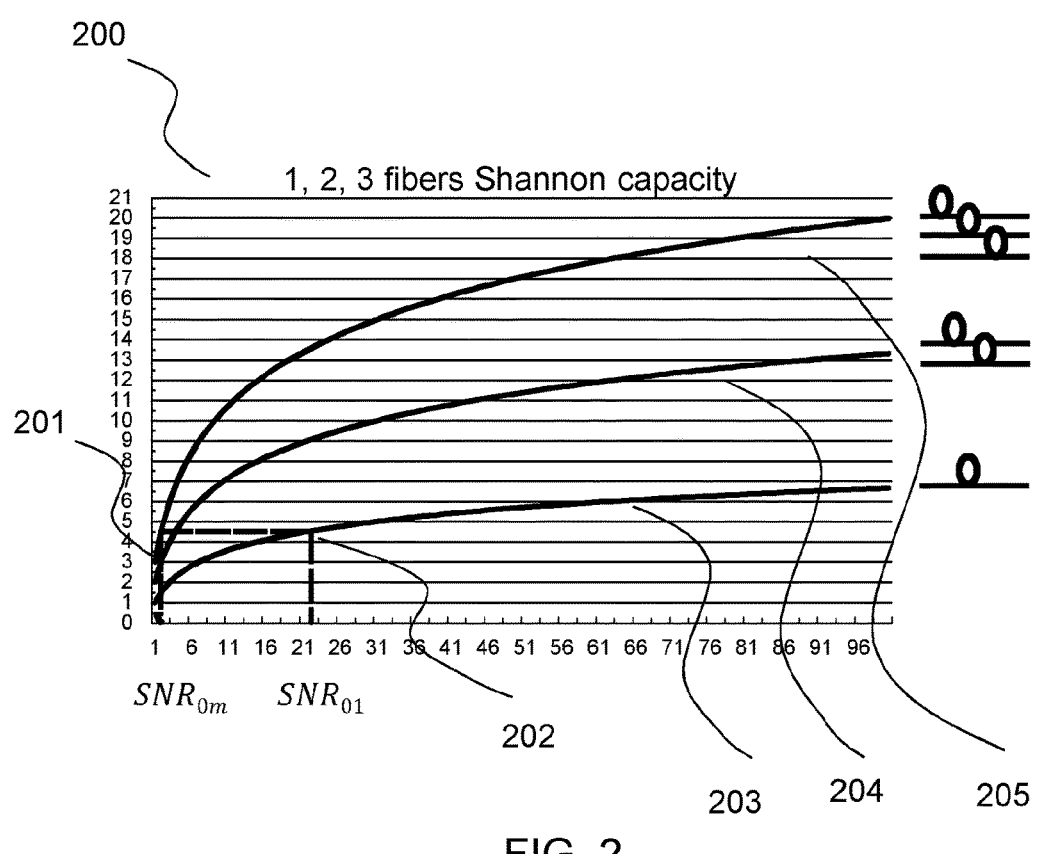
FIG. 2 curves representing the capacity of an optical fibre based transmission link with one, two or three spatial fibre channels.

A first aspect of the present disclosure relates to a method for minimizing the energy consumption and/or the cost of an optical fibre based transmission link characterized by having an optical signal-to-noise-ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has only one optical fibre;

calculating the corresponding capacity $C_{01}$ of the single spatial channel, determined by the $SNR_{01}$, and calculating a number of single spatial channels ($N_{fibre}$) required in the link to obtain a predefined desired total capacity $C_{Total}=N_{fibre}\cdot C_{01}$;

whilst maintaining the same total capacity of the link, distributing the total capacity $C_{Total}$ of the link in $S=m\cdot N_{fibre}$ spatial fibre channels, calculating a required signal-to-noise ratio $SNR_{0m}$ for each of the S spatial fibre channels to support the capacity $C_{Total}/S$, where m is between 1 and 2, or 2, or greater than 2, and wherein S is an integer;

for each fibre calculating a required repeater spacing, or an obtainable link length (reach), in each spatial fibre channel to obtain the required $SNR_{0m}$; and determining the number of m that provides the minimum number of repeaters or selecting m to provide an optimum balance between repeaterless distance and number of spatial fibre channels S.

A further aspect of the present disclosure relates to a method for minimizing the energy consumption and/or the cost of an optical fibre based transmission link characterized by having an optical signal-to-noise-ratio (OSNR) and desired total capacity $C_{Total}$, the method comprising the steps of: calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre; calculating the corresponding capacity $C_{01}$ of the single spatial channel, determined by the $SNR_{01}$, and calculating a number of single spatial channels ($N_{fibre}$) required in the link to obtain a predefined desired total capacity $C_{Total}=N_{fibre}\cdot C_{01}$; whilst maintaining the same total capacity of the link, distributing the capacity of each single spatial fibre channel, $C_{01}$, in m spatial fibre channels, calculating a required signal-to-noise ratio $SNR_{0m}$ for each of the m spatial fibre channels to support the capacity $C_{01}/m$, where m is at least 2; for each m calculating a required repeater spacing in each spatial fibre channel to obtain the required $SNR_{0m}$; and determining the number of m that provides the minimum number of repeaters.

A further aspect of the present disclosure relates to a method for minimizing the energy consumption and/or the cost of an optical fibre based transmission link characterized by having an optical signal to noise ratio (OSNR) and desired total capacity $C_{Total}$, the method comprising the steps of: calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre; calculating the corresponding capacity $C_{01}$ of the single spatial channel, determined by the $SNR_{01}$, and calculating a number of single spatial channels ($N_{fibre}$) required in an optical link to obtain the predefined desired total capacity $C_{Total}=N_{fibre}\cdot C_{01}$; whilst maintaining the same total capacity of the link, distribute the capacity of each single spatial fibre channel, $C_{01}$, in 2 spatial fibre channels (the dual-fibre channel), calculating a required signal-to-noise ratio ($SNR_{02}$) for each of the 2 spatial fibre channels to support the capacity $C_{01}/2$; and calculating a required repeater spacing in each spatial fibre channel to obtain the required $SNR_{02}$.

A further aspect of the present disclosure relates to a method for optimizing the length of a repeaterless optical fibre based transmission link characterized by having an optical signal to noise ratio (OSNR) and desired total capacity $C_{Total}$, the method comprising the steps of: calculating a received signal-to-noise ratio ($SNR_{01}$) in a single spatial channel in the transmission link based on the OSNR of the transmitted optical signal through the repeaterless link, or assuming a given $SNR_{01}$, as determined by a given repeaterless link design, wherein the single spatial channel has one fibre; calculating the corresponding capacity of the single spatial channel $C_{01}$, determined by the $SNR_{01}$, and calculate a number of single spatial fibre channels ($N_{fibre}$) required in a repeaterless link to obtain the desired total capacity $C_{Total}=N_{fibre}\cdot C_{01}$; whilst maintaining the same total capacity of the link, distribute the capacity of each single spatial fibre channel, $C_{01}$, in m spatial fibre channels, calculating a required signal-to-noise ratio ($SNR_{0m}$) for each of the m spatial fibre channels to support the capacity $C_{01}/m$, where m is at least 2; for each m calculating an obtainable link length (reach) of each spatial fibre channel to obtain the required $SNR_{0m}$; and selecting m to provide an optimum balance between repeaterless distance and number of spatial fibre channels m.

A further aspect of the present disclosure relates to a method for minimizing the energy consumption and/or the cost of an optical fibre based transmission link characterized by having an optical signal-to-noise-ratio (OSNR) and desired total capacity $C_{Total}$, the method comprising the steps of: calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre; calculating the corresponding capacity $C_{01}$ of the single spatial channel, determined by the $SNR_{01}$, and calculating a number of single spatial channels ($N_{fibre}$) required in the link to obtain a predefined desired total capacity $C_{Total}=N_{fibre}\cdot C_{01}$; whilst maintaining the same total capacity of the link, distributing the total capacity $C_{Total}$ of the link in $S=m\cdot N_{fibre}$ spatial fibre channels, calculating a required signal-to-noise ratio $SNR_{0m}$ for each of the S spatial fibre channels to support the capacity $C_{Total}/S$, where m is between 1 and 2, or 2, or greater than 2, and wherein S is an integer; for each fibre calculating a required repeater spacing in each spatial fibre channel to obtain the $SNR_{0m}$; and determining the number of m that provides the minimum number of repeaters.

A further aspect of the present disclosure relates to a method for optimizing the length of a repeaterless optical fibre based transmission link characterized by having an optical signal to noise ratio (OSNR) and desired total capacity $C_{Total}$, the method comprising the steps of: calculating a received signal-to-noise ratio ($SNR_{01}$) in a single spatial channel in the transmission link based on the OSNR of the transmitted optical signal through the repeaterless link, or assuming a given $SNR_{01}$, as determined by a given repeaterless link design, wherein the single spatial channel has one fibre; calculating the corresponding capacity of the single spatial channel $C_{01}$, determined by the $SNR_{01}$, and calculating a number of single spatial fibre channels ($N_{fibre}$) required in a repeaterless link to obtain the desired total capacity $C_{Total}=N_{fibre}\cdot C_{01}$; whilst maintaining the same total capacity of the link, distribute the capacity $C_{Total}$ of the link in $S=m\cdot N_{fibre}$ spatial fibre channels, calculating a required signal-to-noise ratio ($SNR_{0m}$) for each of the S spatial fibre channels to support the capacity $C_{Total}/S$, where m is between 1 and 2, or 2, or greater than 2 and wherein S is an integer; for each m calculating an obtainable link length (reach) of each spatial fibre channel to obtain the required $SNR_{0m}$; and selecting m to provide an optimum balance between repeaterless distance and number of spatial fibre channels S.

FIG. 2 shows the capacity of an optical fibre based transmission link with initial $N_{fibre}=1$, as a function of the signal to noise ratio for m=1 (203), that is one spatial fibre channel, m=2 (204), that is two spatial fibre channel or dual-fibre channel and m=3 (205), that is three spatial fibre channels. The total capacity may be, according to the theorem of Shannon, defined as $C_{Total}=N_{fibre}\cdot C_{01}=N_{fibre}\cdot m\cdot B\cdot \log_2(1+SNR_{0m})$, with $N_{fibre}=1$, here. For m=1 the signal-to-noise ratio $SNR_{01}$ is corresponding to point (202) in the FIG. 2. The same capacity can be achieved, for m=3, with signal-to-noise ration $SNR_{0m}$, as shown in point (201) in FIG. 2.

Figure 3:
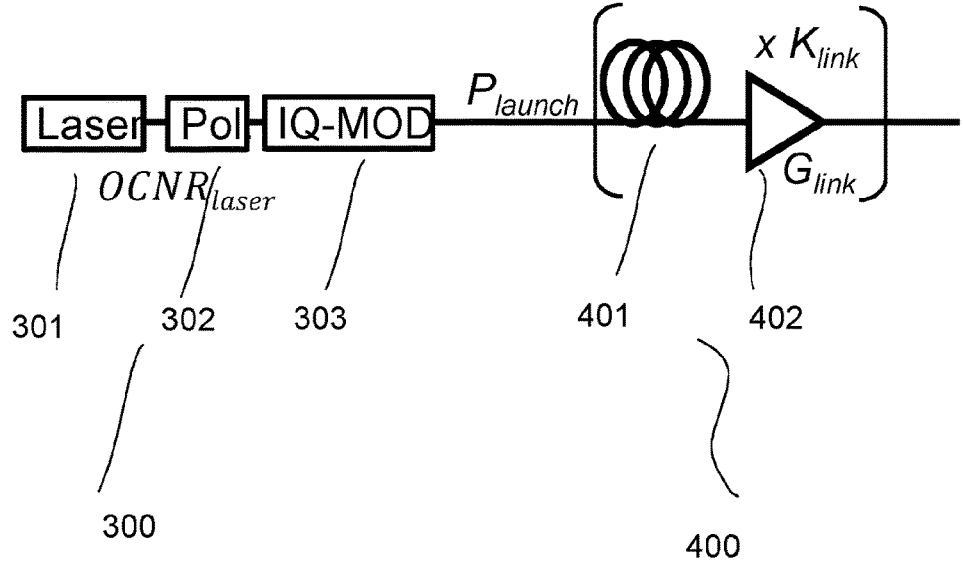
FIG. 3 a representation of a general optical fibre based transmission link with repeaters, with one single spatial channel.

FIG. 3 is showing a typical optical fibre based transmission link with one fibre channel. The optical fibre based transmission link has a transmitter (300), which is part of a transceiver. The transmitter consists of a laser (301) with a given optical carrier to noise ratio (OCNR), a data modulator (303) modulating both the in-phase (1) and quadrature (Q) part of the laser electric field, and a polarizer (302) before the modulator. The polarizer effectively filters away half of the noise there might be before modulating. The power launched into the optical fibre based transmission link is $P_{launch}$, mostly set to 0 dBm in this embodiment. The link may consist of $K_{link}$ (400) spans (401) of fibre with its loss compensated by a repeater (402), which may be an erbium-doped-fbre-amplifier (EDFA), with gain set equal, in this embodiment, to the span transmission loss $G_{link}$, wherein the span is the repeaterless distance.

FIG. 4 is showing, in one embodiment, the result of the optimization achieved by the presently disclosed application, on the optical fibre based transmission link. A typical optical fibre based transmission link with one spatial fibre channel (500), that is with with initial $N_{fibre}=1$ and m=1, has 7 repeaters. The same length can be covered by an optical fibre based transmission link with two spatial fibre channels (600), with m=2. In this embodiment the optical fibre based transmission link with two spatial fibre channels has 2 repeaters per spatial fibre channel, that is a total of 4 repeaters. Therefore, in this embodiment, the two spatial fibre channel based optical fibre based transmission link is achieving a significant reduction of the number of repeaters, therefore a reduction of the energy consumption and the cost of the optical fibre based transmission link.

Figure 5:
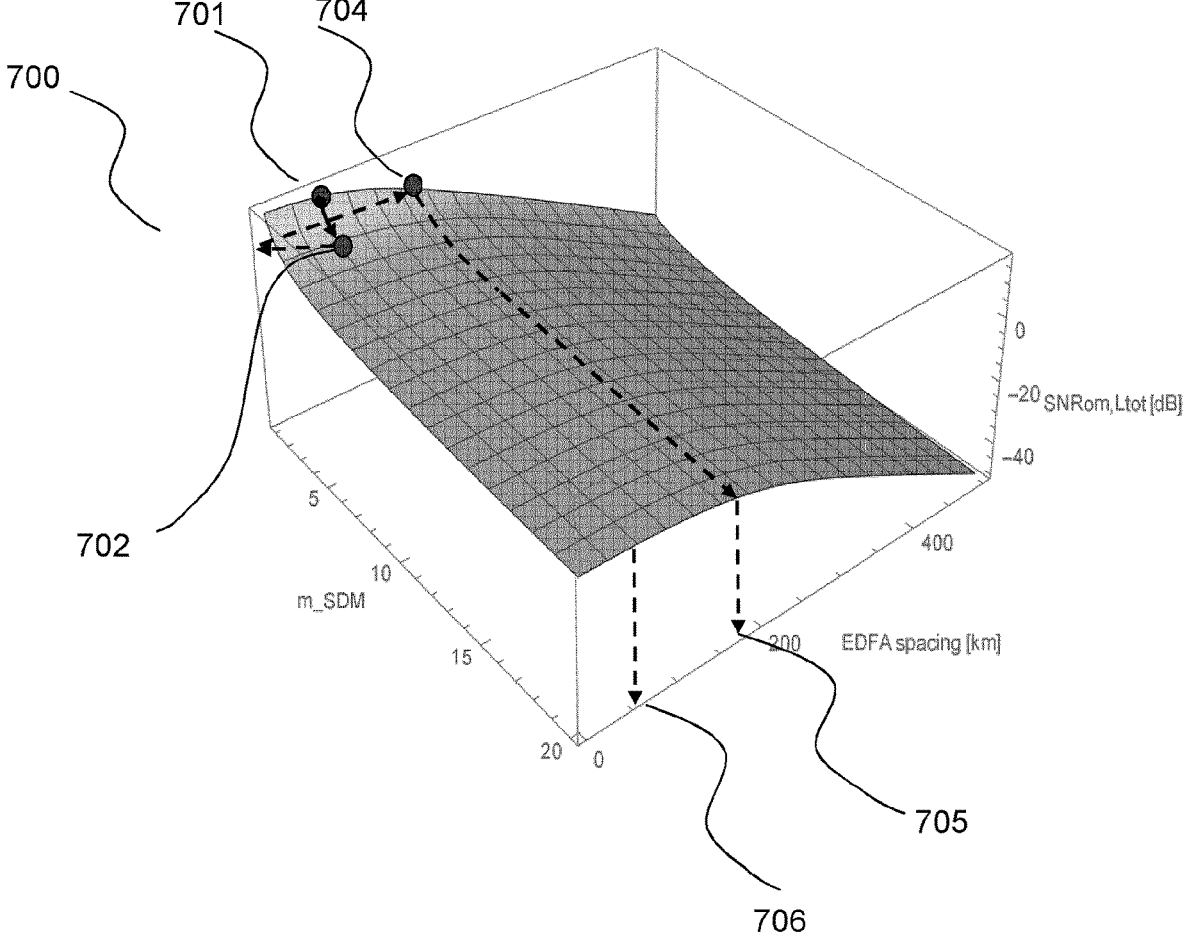
FIG. 5 a graphical representation of the optimization process.

FIG. 5 is a graphical representation of one embodiment of the methods disclosed in the present application. Starting from a given $SNR_{01}$ of the optical fibre based transmission link with one spatial fibre channel (701), corresponding to a non-optimum repeater spacing (706), one can follow the curve to obtain the required $SNR_{0m}$ of the optimized optical fibre based transmission link with m>=2 (702) and project the latter value of $SNR_{0m}$ on the curve (704) to obtain the required spacing or span length (705) for m>=2.

According to the methods presently disclosed, each of the 2 or multiple spatial fibre channels is independent from each other in such a way that there is no cross-talk from any one of the 2 or multiple spatial fibre channels to any of the other spatial fibre channels and wherein the total capacity of the 2 or multiple independent spatial fibre channels is the sum of the capacities of each of the 2 or multiple independent spatial fibre channels, and wherein the spatial fibre channels are corresponding to multiple isolated individual fibres.

Multiple spatial fibre channels may be $S=m\cdot N_{fibre}$ spatial fibre channels. For example, if $N_{fibre}=1$, S=m. Therefore, in the specific case of $N_{fibre}=1$, m may be an integer.

For $N_{fibre}=2$, S=2*m.

m may be a ratio between the number of multiple spatial fibre channels S and the number of single spatial fibre channels $N_{fibre}$. m may therefore be a number between 1 and 2, or 2 or a number above 2. For example if the number of single spatial fibre channels $N_{fibre}=4$ a, with a m=6/4 a number of multiple spatial fibre channels S may be 6.

In the context of this disclosure, a 2 or multiple independent spatial fibre channel is a multiple independent spatial fibre channel respectively with m=2 or m different from 2. This is because the inventors have realized that an optimum value of m is typically 2, but values of m different from 2 may be optimum in other cases.

In addition, in the presently disclosed methods, the capacity $C_{Total}$ of the fibre based transmission link with multiple or 2 spatial fibre channels may be the same as the capacity $C_{Total}$ of the fibre based transmission link with one spatial fibre channel.

In an embodiment of the present disclosure, the optimum value of m for minimization of energy consumption and/or cost is found for m=2.

In an embodiment of the present disclosure, each spatial fibre channel implements any of wavelength division multiplexing (WDM) or spatial division multiplexing (SDM), or other multiplexing techniques, or no multiplexing technique.

In a further embodiment, the total capacity of a fibre link with $N_{fibre}$ single spatial fibre channels is defined as $C_{Total}=N_{fibre}\cdot C_{01}$, where $C_{01}=B\cdot \log_2(1+SNR_{01})$ is the capacity of each single spatial fibre channel, and the same total capacity for the optimized optical fibre based transmission link with multiple spatial fibre channels is defined as $C_{Total}=N_{fibre}\cdot m\cdot B\cdot \log_2(1+SNR_{0m})$ and, in case of two spatial fibre channels $C_{Total}=N_{fibre}\cdot 2\cdot B\ \log_2(1+SNR_{0m})$, wherein B is the bandwidth of the data signal.

The signal-to-noise ratio of the each spatial fibre channel, in case of an optical fibre based transmission link with multiple spatial fibre channels $SNR_{0m}$ is related to $SNR_{01}$ according to the following equation $$SNR_{0m} = [1 + SNR_{01}]^{\frac{1}{m}} - 1$$

wherein $SNR_{0m}$ practically reduces to $$SNR_{0m} \approx \frac{1}{m} \ln[1 + SNR_{01}]$$

for m>=10.

In an embodiment of the present disclosure the $N_{fibre}$ single spatial fibre channels may implement a first spatial division multiplexing (SDM), wherein each single fibre channel is characterized by a signal-to-noise ration $SNR_{01}$, whereas the m spatial fibre channels may implement a second spatial division multiplexing (SDM) wherein each one of the multiple spatial fibre channels has a signal-to-noise ratio $$SNR_{0m} = [1 + SNR_{01}]^{\frac{1}{m}} - 1.$$

The signal-to-noise ratio of the optical fibre based transmission link with one spatial fibre channel $SNR_{01}$ is defined as $$SNR_{01} = \frac{B_{ref}}{R_s} \cdot OSNR_{01},$$

wherein $B_{ref}$ is a reference bandwidth, $R_S$ is the symbol rate, and $OSNR_{01}$ is the optical signal to noise ratio of the single spatial channel.

The signal-to-noise ratio of the each spatial fibre channel, in case of an optical fibre based transmission link with 1 spatial fibre channels $SNR_{01}$ can be derived and is defined as $$SNR_{01} = \frac{B_{ref}}{R_S} \frac{P_{launch}}{\left(\frac{1}{2}\right)\left[\frac{P_{launch}}{OCNR_{laser}}\right] + 2n_{sp}h\upsilon B_{ref}K_{link}(G_{link} - 1)},$$

wherein $P_{launch}$ is the power launched in the fiber, $OCNR_{laser}$ is the optical carrier to noise ratio of the transmission laser, $n_{sp}$ is the spontaneous emission factor of the optical amplifiers in the link, h is Planck's constant, $\mu$ is the optical frequency, $K_{link}$ is the number of repeaters, $G_{link}$ is the gain of the optical amplifiers, within each repeater, used to exactly compensate for the transmission loss within the repeater spacing.

The transmission loss $G_{link}$ is defined as $G_{link} = 10^{-\alpha_{dB}L_{EDFA}/10}$, wherein $L_{EDFA}$ is the repeater spacing and $\alpha_{dB}$ is the fibre transmission loss per kilometre in dBs In one embodiment of the presently disclosed application, $L_{tot}$ is the total length of the fibre based transmission link, and wherein $K_{link,m} = L_{tot}/L_{EDFA,m}$ is the number of repeaters for the fibre based transmission link with m spatial fibre channels, $K_{link1} = L_{tot}/L_{EDFA1}$ is the number of repeaters for the fibre based transmission link with one spatial fibre channel, $L_{EDFAm}$ is the repeater spacing for the fibre based transmission link with multiple spatial fibre channels and $L_{EDFA1}$ is the repeater spacing for the fibre based transmission link with one spatial fibre channel and wherein $K_{linkm}/$ $K_{link1} = m/(L_{EDFAm}/L_{EDFA1})$ and wherein the following constraint is used to obtain an optimum value of m:

$$\frac{L_{EDFAm}}{L_{EDFA1}} > m$$

In one embodiment of the present disclosure, energy and/or cost reduction and optimization are achieved by reducing and minimizing the total number of repeaters on the optical fibre based transmission link, wherein the energy and the cost related to the launch power of the transceivers is less than the energy and the cost associated to the repeaters.

In a further embodiment, energy and/or cost reduction of an optical fibre based transmission link and optimization are achieved by maximizing the total length of the reapeterless optical fibre based transmission link, and the $SNR_{0m}$ is less than the $SNR_{01}$.

In an additional embodiment of the present disclosure, the total number of repeaters, and therefore the energy consumption and the cost, of the fibre based transmission link with multiple or 2 spatial fibre channels is less than the total number of repeaters, energy and cost of the fibre based transmission link with one spatial fibre channel.

In a further embodiment, the length of the repeaterless span of the fibre based transmission link with m spatial fibre channels is larger than the repeaterless span of the fibre based transmission link with one spatial fibre channel.

In one embodiment of the present disclosure, if the total number of repeaters is 7 on the fibre based transmission link corresponding to a $SNR_{01}$, this number of repeaters is reduced to 4 for m=2, that is 2 amplifiers per spatial fibre channel, on the fibre based transmission link corresponding to a $SNR_{0m}$. That is shown in FIG. 4.

In a further embodiment of the presently disclosed application, $B_{ref}$ is a reference bandwidth, which may be 12.5 GHz.

In another embodiment of the present disclosure, the energy consumption and the cost of an optical fibre based transmission link is balanced taking into account both the energy consumption and the cost of the repeaters and also the energy consumption and the cost of the transceivers, wherein the optimum value is found for m=2, that is for a two-fibre, or dual-fibre, optical fibre based transmission link.

In an embodiment of the present disclosure, m may be equal to 1.5 and S, being $S=m \cdot N_{fibre}$, may be equal to 6 if $N_{fibre}$ is equal to 4, or m may be not an integer, provided that S is an integer.

As also discussed above the presently disclosed approach can be used for optimizing fibre count and span length to reduce the number of amplifiers (repeaters), i.e. thereby reducing energy consumption. However, the "saved" resources (repeaters) can be used to achieve different things.

Build a transmission link which is cheaper and more efficient, in particular due to a reduced number of repeaters.

Add more capacity to the transmission link.

Increase the link length, for example until a link length is found where the optimized system uses the same number of amplifiers as the un-optimized one. I.e. the presently disclosed approach provides for a 'trade': Reduction in required amplifiers for a longer link.

Hence, the presently disclosed approach can at least be applied in the following four different optimization scenarios, all relying on the "dual-fibre"/"multi-fibre" principle:

Systems with repeaters

1. Reduce and/or minimize energy/cost for desired total capacity(i.e. total desired capacity and length of transmission link are fixed): Add more fibers and change the total number of amplifiers accordingly. I.e. for a multi-fibered cable; add one fiber at a time to the cable and derive the benefits until an optimum is reached. Example calculations show that going from 8 to 10 fibre-pairs (i.e. 10 each way) in a cable would reduce the number of amplifiers without adding too much cost on the added transceivers, and give an overall cost and energy-reduction. Other calculations show that going from 12 to 22 fibre-pairs give a large reduction in cost/bit and enables considerable larger capacity.

2. Increase and/or maximize total capacity for given energy consumption, i.e. length of link and energy consumption/number of repeaters are fixed. E.g. by keeping the original number of amplifiers in a fixed length link, but distribute them in m fibres and with an amplifier spacing of m*L_01, then the SNR in each fibre will lower the data capacity, but not more than the factor m increases the total capacity, so the capacity is increased (m*C_0m>C_01), while keeping the number of amplifiers constant, and hence keeping the energy consumption fairly constant also, and potentially also the cost/bit. Detailed numerical simulations have confirmed that indeed one gets higher capacity for the same number of amplifiers with this approach as presently disclosed. I.e. in number 1. above the desired capacity is fixed and then this fixed capacity is distributed into additional fibres, whereas in number 2. the amplifiers (and not the data) are distributed into additional fibres. I.e. the low single-fibre SNR_01 is swapped to shorter length higher SNR_01', which is then data-distribute (by the presently disclosed "dual-fibre concept") this corresponding C_01' to m fibres with increased length till it reaches L_01.

Systems without Repeaters

3. Increase and/or maximize length of repeaterless system for desired total capacity: Use data-distribution concept to plot L_0m vs L_01, where every L_01 results in a certain SNR_01 and hence data capacity, C_01. Compare for example to the 515 km system described in "800 Gb/s (8×128 Gb/s) unrepeated transmission over 515-km large-area ultralow-loss fiber using 2nd-order Raman pumping", B. ZHU et al., Optics Express 2016, Vol. 24, Issue 22, pp. 25291-25297 (2016). At the initial L_01, e.g. 515 km, read out the L_0m, which is derived under the constraint of giving C_01/m capacity in each fibre. In the example of 515 km, for m=2, the present approach provides about 580 km. For m=4, one gets about 625 km. For m=6, one gets about 640 km 4. Increase and/or maximize total capacity for given length of link: E.g. for a transmission undersea cable from Newcastle (UK) to Esbjerg (Denmark) of 631 km; calculate the SNR_01 and corresponding C_01 for a single unrepeatered fiber system. Plot L_0m vs L_01 for given C_01s, and then reading at L_0m=631 km which L_01'-reach that would correspond to, and hence which SNR_01' and C_01' that would correspond to, for m=3, 4, 5 . . . . This new C_01' will be larger than the original C_01, because it will correspond to a much shorter L_01'<L_01, and therefore a larger SNR_01'>SNR_01. And C_01'=m*C_0m. E.g. L_01=631 km. C_01 gives ca 150 Gbit/s, if 8×WDM is considered. C_01' gives for 631 km, for m=2, ca 300 Gbit/s, for m=4, ca 590 Gbit/s, and for m=6 ca 810 Gbit/s, and with diminishing benefits after that.

EXAMPLES

Table 1-Table 4 list different parameters for the non-optimum and optimum optical fibre based transmission links with different values of m. In these examples, $N_{fibre}$=1, and therefore S=m, thus m is an integer. However, other non-integer values of m may also be obtained by the presently disclosed method without compromising the present disclosure. In these tables, $L_{tot}$ is the total length of the optical fibre based transmission link in kilometres, a is the loss in the fibre in dB per kilometre, $m_{SDM}$=m, $L_{EDFA}$ is the repeaterless distance or span, #EDFAm is the number of repeaters for m spatial fibre channels, #EDFA1 is the number of repeaters for a one spatial fibre channel link, $L_1$ is the length of the span or repeaterless distance for a one spatial fibre channel link, $L_m$ is the length of the span or repeaterless distance in case on multiple spatial fibre channels, the OCNR is the optical carrier to noise ratio.

TABLE 1

| $L_{tot}$ = 14.000 km $\alpha$ = 0.15 dB/km, OCNR= 55 dB | m | $SNR_{0m}$ [dB] | $L_{EDFA}$ [km] | $\dfrac{\#EDFAm}{\#EDFA1} = \dfrac{mSDM}{Lm/L1}$ [%] |
|---|---|---|---|---|
| | 1 | 18 | 50 | 100% |
| | 2 | 8.6 | 137 | 73% |
| | 3 | 4.9 | 168 | 89% |
| | 4 | 2.7 | 186 | 107% |
| OCNR = 25 dB | 1 | 17 | 50 | 100% |
| | 2 | 8 | 141 | 71% |
| | 3 | 4.4 | 171 | 88% |
| | 4 | 2.3 | 188 | 106% |
| OCNR = 20 dB | 1 | 15.5 | 50 | 100% |
| | 2 | 7 | 148 | 67% |
| | 3 | 3.7 | 176 | 85% |
| | 4 | 1.7 | 192 | 104% |

Table 1 refers to a trans-Pacific link, of a length of 14.000 km. For different values of m the signal-to-noise ratio is specified. The length of the span $L_{EDFA}$ in km and the percentage of the total number of amplifiers as compared to the single-fibre link (m=1) is also specified. The assumed attenuation is a. The data is presented for different values of the OCNR (Optical Carrier to Noise Ratio).

TABLE 2

| $L_{tot}$ = 7.000 km<br>α = 0.15 dB/km, OCNR = 20 dB | m | $SNR_{0m}$ [dB] | $L_{EDFA}$ [km] | $\frac{\#EDFAm}{\#EDFA1} = \frac{mSDM}{Lm/L1}$ [%] |
|---|---|---|---|---|
| | 1 | 17 | 50 | 100% |
| | 2 | 7.8 | 165 | 60% |
| | 3 | 4.3 | 195 | 77% |
| | 4 | 2.2 | 212 | 94% |
| | 5 | 0.75 | 223 | 112% |
| $L_{tot}$ = 3.000 km | 1 | 17 (17.9) | 80 (50) | 100% |
| | 2 | 8 (8.4) | 193 (180) | 82% (55%) |
| | 3 | 4.4 (4.7) | 221 (220) | 108% (68%) |

Table 2 refers to a trans-Atlantic link of a length of 7.000 km, and another regional link, of a length of 3.000 km. The upper part of the table refers to a 7.000 km long link, the lower part of the table presents the data for a 3.000 km long link. For different values of m the signal-to-noise ratio is specified. The length of the span $L_{EDFA}$ and the percentage of the total number of amplifiers as compared to the single-fibre link (m=1) is also specified. The assumed attenuation is a.

TABLE 3

| α = 0.15 dB/km,<br>OCNR = 20 dB | m | $SNR_{0m}$ [dB] | $L_m$ [km] | $\frac{Lm}{L1}$ [%] |
|---|---|---|---|---|
| | 1 | 18.9 | 80 | 100% |
| | 2 | 8.9 | 266 | 333% |
| | 3 | 5.2 | 293 | 366% |
| | 4 | 2.95 | 309 | 386% |
| | 5 | 1.43 | 318 | 398% |
| | 6 | 0.28 | 326 | 408% |
| | 7 | −0.6 | 332 | 415% |
| | 8 | −1.4 | 338 | 423% |
| | 9 | −2−1 | 343 | 429% |
| | 10 | −2.6 | 346 | 432% |
| | 20 | −6 | 369 | 461% |
| | 50 | −10.4 | 398 | 498% |

Table 3 refers to a repeaterless link. The length in km (Lm) and the length increase in percentage, as compared to the single-spatial channel link (m=1, $L_1$), for different values of m is specified for the given values of the Optical Carrier to Noise Ratio (OCNR) and the attenuation a.

TABLE 4

| α = 0.2 dB/km,<br>OCNR = 55 dB | m | $SNR_{0m}$ [dB] | $L_m$ [km] | $\frac{Lm}{L1}$ [%] |
|---|---|---|---|---|
| | 1 | 33.4 | 80 | 100% |
| | 10 | 0.64 | 242 | 303% |
| | | (0.09) | (231) | (288%) |
| | 20 | −3.3 | 261 | 326% |
| | 50 | −7.8 | 282 | 352% |

Table 4 refers to a repeaterless link. The length increase for different values of m is specified for the given values of the Optical Carrier to Noise Ratio (OCNR) and the attenuation a.

In one example, if the initial $SNR_{01}$ is set to 22 dB, then the $SNR_{0m}$ decreases with increasing the number of the spatial fibre channels m and practically saturates at 7 dB for m equal or more than 10.

In another example, the number of repeaters is reduced to below 73%, more preferably below 71%, more preferably below 67% for m=2 and for an optical fibre based transmis-sion link of length between 13.000 km and 15.000 km, or below 70%, more preferably below 60% for m=2 and for an optical fibre based transmission link of length between 6.300 km and 7700 km, or below 82%, more preferably below 55% for m=2 and for optical fibre based transmission link with length between a 2.700 km and 3300 km.

In a further example, the number of repeaters is reduced to 73%, for m=2 and for an optical fibre based transmission link of length 14.000 km, or 60% for m=2 and for an optical fibre based transmission link of length 7000 km, or 55% for m=2 and for optical fibre based transmission link with length of 3000 km.

In another example, with m=2, the number of repeaters is reduced by more than 80 repeaters, preferably more than 91 repeaters, for an optical fibre based transmission link of length between 13.000 km and 15.000 km, or the number of repeaters is reduced by more than 50 repeaters, preferably more than 55 repeaters, for an optical fibre based transmission link of length between 6.300 km and 7700 km.

In another example, for a total length of the optical fibre based transmission link of 14.000 kilometres, corresponding to trans-Pacific reach, for a realistic OCNR=20 dB, the repeaterless spacing is increased from 50 km, for a one fibre link, to 148 km, for a two-fibre link, and the number of repeaters is reduced by 92 repeaters for the two-fibre optical fibre based transmission link, as compared to 280 repeaters for the one-fibre optical fibre based transmission link.

In an additional example, for a total length of the optical fibre based transmission link of 7.000 kilometres, corresponding to trans-Atlantic reach, for a realistic OCNR=20 dB, the repeaterless spacing is increased from 50 km, for a one fibre link, to 165 km, for a two-fibre link, and the number of repeaters is reduced by 56 repeaters for the two-fibre optical fibre based transmission link, resulting in 60% of the total number of repeaters of the one-fibre optical fibre based transmission link.

In an additional example, for a total length of the optical fibre based transmission link of 3.000 kilometres, for a realistic OCNR=20 dB, the repeaterless spacing is increased from 50 km, for a one fibre link, to 180 km, for a two-fibre link, and the number of repeaters for the two-fibre optical fibre based transmission link is reduced by 45% as compared to the total number of repeaters of the one-fibre optical fibre based transmission link.

In a further example, for a total length of the optical fibre based transmission link of 10.000 kilometres the repeaterless spacing may be 50 km and the number of repeaters may be 200 for a for a one fibre optical fibre based transmission link, and, for a two-fibre optical fibre based transmission link, the number of repeaters for the two-fibre optical fibre based transmission may be half as much.

In a further example, with m=2, the number of repeaters is reduced by more than 45% for an optical fibre based transmission link with length between a 2.700 km and 3300 km, or by 60% for an optical fibre based transmission link with length between a 400 km and 600 km.

In another example, for m=2, the repeater spacing is at least 130 km if the total length of the link is between 13.000 km and 15.000 km or at least 160 km if the total length of the link is between 6500 km and 7500 km or at least 170 km if the total length of the link is between 2700 km and 3300 km.

In a further example, $SNR_{01}$ is between 15.5 dB and 18 dB for an optical fibre based transmission link of length between 13.000 km and 15.000 km and OCNR (Optical Carrier to Noise Ratio) between 20 dB and 55 dB and damping factor 0.15 dB/km, and $SNR_{0m}$ is between 7 dB and 8.6 dB for m=2.

In an additional example, $SNR_{01}$ is 17 dB for an optical fibre based transmission link of length between 6.300 km and 7.700 km and OCNR (Optical Carrier to Noise Ratio) of 20 dB and damping factor 0.15 dB/km, and $SNR_{0m}$ is 7.8 dB for m=2.

In a further example, $SNR_{01}$ is between 17 dB and 17.9 dB for an optical fibre based transmission link of length between 2.700 km and 3.300 km and OCNR (Optical Carrier to Noise Ratio) of 20 dB and damping factor 0.15 dB/km, and $SNR_{0m}$ is between 8 dB and 8.4 dB for m=2.

In a further example, the optical fibre based transmission link has a total length between 6500 km and 7.500 km and the repeater spacing is 50 km for m=1, or more than 165 km for m=2, or more than 195 km for m=3 and wherein m=1 corresponds to an optical fibre based transmission link with $SNR_{01}$, and m>=2 corresponds to an optimized optical fibre based transmission link with $SNR_{0m}$.

In another example, the optical fibre based transmission link has a total length between 13.000 km and 15.000 km and the repeater spacing is 50 km for m=1, or more than 137 km for m=2, or more than 168 km for m=3, and wherein m=1 corresponds to an optical fibre based transmission link with $SNR_{01}$, and m>=2 corresponds to an optimized optical fibre based transmission link with $SNR_{0m}$.

In another example, the length of the repeaterless distance of a repeaterless optical fibre based transmission link is at least 200 km or more preferably at least 266 km for m=2, or at least 346 km for m=10, with an OCNR of 20 dB and a damping factor of 0.15 dB/km.

In a further example, the length of the repeaterless distance is at least 231 km for m=10 with an OCNR of 55 dB and a damping factor of 0.2 dB/km.

Further Details

1. A method for minimizing the energy consumption and/or the cost of an optical fibre based transmission link characterized by having an optical signal-to-noise-ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre;

calculating the corresponding capacity $C_{01}$ of the single spatial channel, determined by the $SNR_{01}$, and calculating a number of single spatial channels ($N_{fibre}$) required in the link to obtain a predefined desired total capacity $C_{Total}=N_{fibre} \cdot C_{01}$;

whilst maintaining the same total capacity of the link, distributing the capacity of each single spatial fibre channel, $C_{01}$, in m spatial fibre channels, calculating a required signal-to-noise ratio $SNR_{0m}$ for each of the m spatial fibre channels to support the capacity $C_{01}/m$, where m is at least 2;

for each m calculating a required repeater spacing in each spatial fibre channel to obtain the required $SNR_{0m}$; and determining the number of m that provides the minimum number of repeaters.

2. A method for minimizing the energy consumption and/or the cost of an optical fibre based transmission link characterized by having an optical signal to noise ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre;

calculating the corresponding capacity $C_{01}$ of the single spatial channel, determined by the $SNR_{01}$, and calculating a number of single spatial channels ($N_{fibre}$) required in an optical link to obtain the predefined desired total capacity $C_{Total}=N_{fibre} \cdot C_{01}$;

whilst maintaining the same total capacity of the link, distribute the capacity of each single spatial fibre channel, $C_{01}$, in 2 spatial fibre channels (the dual-fibre channel), calculating a required signal-to-noise ratio ($SNR_{02}$) for each of the 2 spatial fibre channels to support the capacity $C_{01}/2$; and calculating a required repeater spacing in each spatial fibre channel to obtain the required $SNR_{02}$.

3. A method for optimizing the length of a repeaterless optical fibre based transmission link characterized by having an optical signal to noise ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the repeaterless link, or assuming a given $SNR_{01}$, as determined by a given repeaterless link design, wherein the single spatial channel has one fibre;

calculating the corresponding capacity of the single spatial channel $C_{01}$, determined by the $SNR_{01}$, and calculating a number of single spatial fibre channels ($N_{fibre}$) required in a repeaterless link to obtain the desired total capacity $C_{Total}=N_{fibre} \cdot C_{01}$;

whilst maintaining the same total capacity of the link, distribute the capacity of each single spatial fibre channel, $C_{01}$, in m spatial fibre channels, calculating a required signal-to-noise ratio ($SNR_{0m}$) for each of the m spatial fibre channels to support the capacity $C_{01}/m$, where m is at least 2;

for each m calculating an obtainable link length (reach) of each spatial fibre channel to obtain the required $SNR_{0m}$; and selecting m to provide an optimum balance between repeaterless distance and number of spatial fibre channels m.

4. A method for minimizing the energy consumption and/or the cost of an optical fibre based transmission link characterized by having an optical signal-to-noise-ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has one optical fibre;

calculating the corresponding capacity $C_{01}$ of the single spatial channel, determined by the $SNR_{01}$, and calculating a number of single spatial channels ($N_{fibre}$) required in the link to obtain a predefined desired total capacity $C_{Total}=N_{fibre} \cdot C_{01}$;

whilst maintaining the same total capacity of the link, distributing the total capacity $C_{Total}$ of the link in $S=m \cdot N_{fibre}$ spatial fibre channels, calculating a required signal-to-noise ratio $SNR_{0m}$ for each of the S spatial fibre channels to support the capacity $C_{Total}/S$, where m is between 1 and 2, or 2, or greater than 2, and wherein S is an integer;

for each fibre calculating a required repeater spacing in each spatial fibre channel to obtain the required $SNR_{0m}$; and determining the number of m that provides the minimum number of repeaters.

5. A method for optimizing the length of a repeaterless optical fibre based transmission link characterized by having an optical signal to noise ratio (OSNR) and desired total capacity $C_{Total}$, the method comprising the steps of:

calculating a received signal-to-noise ratio ($SNR_{01}$) in a single spatial channel in the transmission link based on the OSNR of the transmitted optical signal through the repeaterless link, or assuming a given $SNR_{01}$, as determined by a given repeaterless link design, wherein the single spatial channel has one fibre;

calculating the corresponding capacity of the single spatial channel $C_{01}$, determined by the $SNR_{01}$, and calculating a number of single spatial fibre channels ($N_{fibre}$) required in a repeaterless link to obtain the desired total capacity $C_{Total}=N_{fibre} \cdot C_{01}$;

whilst maintaining the same total capacity of the link, distribute the capacity $C_{Total}$ of the link in $S=m \cdot N_{fibre}$ spatial fibre channels, calculating a required signal-to-noise ratio ($SNR_{0m}$) for each of the S spatial fibre channels to support the capacity $C_{Total}/S$, where m is between 1 and 2, or 2, or greater than 2 and wherein S is an integer;

for each m calculating an obtainable link length (reach) of each spatial fibre channel to obtain the required $SNR_{0m}$; and selecting m to provide an optimum balance between repeaterless distance and number of spatial fibre channels S.

6. The method according to any one of the preceding items, wherein each of the 2 or multiple spatial fibre channels is independent from each other in such a way that there is no cross-talk from any one of the 2 or multiple spatial fibre channels to any of the other spatial fibre channels and wherein the total capacity of the 2 or multiple independent spatial fibre channels is the sum of the capacities of each of the 2 or multiple independent spatial fibre channels.

7. The method according to any one of the preceding items, wherein the capacity $C_{Total}$ of the fibre based transmission link with multiple or 2 spatial fibre channels is the same as the capacity $C_{Total}$ of the fibre based transmission link with one spatial fibre channel.

8. The method according to any one of the preceding items, wherein the optimum value for m is found for m=2.

9. The method according to any one of the preceding items, wherein each spatial fibre channel implements any of wavelength division multiplexing (WDM) or spatial division multiplexing (SDM), or other multiplexing techniques, or no multiplexing technique.

10. The method according to any one of the preceding items, wherein the total capacity of a fibre link with $N_{fibre}$ single spatial fibre channels is defined as $C_{Total}=N_{fibre} \cdot C_{01}$, where $C_{01}=B \cdot \log_2(1+SNR_{01})$ is the capacity of each single spatial fibre channel, and the same total capacity for the optimized optical fibre based transmission link with m spatial fibre channels is defined as $C_{Total}=N_{fibre} \cdot m \cdot B \cdot \log_2(1+SNR_{0m})$ and, in case of two spatial fibre channels $C_{Total}=N_{fibre} \cdot 2 \cdot B \log_2(1+SNR_{0m})$, wherein B is the bandwidth of the data signal.

11. The method according to item 10, wherein $SNR_{0m}$ is related to $SNR_{01}$ according to the following equation $$SNR_{0m} = [1 + SNR_{01}]^{\frac{1}{m}} - 1,$$

wherein $SNR_{0m}$ practically reduces to $$SNR_{0m} \approx \frac{1}{m}\ln[1 + SNR_{01}]$$

for m>=10.

12. The method according to items 10 and 11, wherein $SNR_{01}$ is defined as $$SNR_{01} = \frac{B_{ref}}{R_S} \cdot OSNR_{01},$$

and $SNR_{0m}$ is defined as $$SNR_{0m} = [1 + SNR_{01}]^{\frac{1}{m}} - 1,$$

wherein $B_{ref}$ is a reference bandwidth, $R_S$ is the symbol rate, and $OSNR_{01}$ is the optical signal to noise ratio of the single spatial channel.

13. The method according to any of items 10, 11 and 12, wherein $SNR_{01}$ is defined as $$SNR_{01} = \frac{B_{ref}}{R_s} \frac{P_{launch}}{\left(\frac{1}{2}\right)\left[\frac{P_{launch}}{OCNR_{laser}}\right] + 2n_{sp}h\nu B_{ref}K_{link}(G_{link} - 1)},$$

wherein $P_{launch}$ is the power launched in the fiber, $OCNR_{laser}$ is the optical carrier to noise ratio of the transmission laser, $n_{sp}$ is the spontaneous emission factor of the optical amplifiers in the link, h is Planck's constant, u is the optical frequency, $K_{link}$ is the number of repeaters, $G_{link}$ is the gain of the optical amplifiers, within each repeater, used to exactly compensate for the transmission loss within the repeater spacing.

14. The method according to any of items 10, 11, 12 and 13 wherein the transmission loss $G_{link}$ is defined as $G_{link}=10^{-\alpha_{dB}L_{EDFA}/10}$, wherein $L_{EDFA}$ is the repeater spacing and $\alpha_{dB}$ is the fibre transmission loss per kilometre in dBs 15. The method according to any of items 10, 11, 12, 13 and 14, wherein $L_{tot}$ is the total length of the fibre based transmission link, and wherein $K_{link,m}=L_{tot}/L_{EDFA,m}$ is the number of repeaters for the fibre based transmission link with m or S spatial fibre channels, $K_{link1}=L_{tot}/L_{EDFA1}$ is the number of repeaters for the fibre based transmission link with one fibre channel (single spatial fibre channel), $L_{EDFAm}$ is the repeater spacing for the fibre based transmission link with m spatial fibre channels and $L_{EDFA1}$ is the repeater spacing for the fibre based transmission link with one fibre channel and wherein $K_{linkm}/K_{link1}=m/(L_{EDFAm}/L_{EDFA1})$ and wherein the following constraint is used to obtain an optimum value of m:

$$\frac{L_{EDFAm}}{L_{EDFA_1}} > m$$

16. The method according to any one of the preceding items, wherein energy and/or cost reduction and optimization are achieved by reducing and minimizing the total number of repeaters on the optical fibre based transmission link.

17. The method according to any one of the preceding items, wherein energy and/or cost reduction and optimization are achieved by maximizing the total length of the reapeterless optical fibre based transmission link, and wherein the $SNR_{0m}$ is less than the $SNR_{01}$.

18. An optical fibre based transmission link dimensioned using the method according to any of items 1-2 or 1, or 3-17, wherein the total number of repeaters, and therefore the energy consumption and the cost, of the fibre based transmission link with multiple or 2 spatial fibre channels is less than the total number of repeaters, energy and cost of the fibre based transmission link with one spatial fibre channel.

19. A repeaterless optical fibre based transmission link dimensioned using the method according to any of items 3 or 2-15, wherein the length of the repeaterless span of the fibre based transmission link with multiple spatial fibre channels is larger than the repeaterless span of the fibre based transmission link with one spatial fibre channel (single spatial fibre channel).

20. A method for maximizing capacity of an optical fibre based transmission link characterized by an optical signal-to-noise-ratio (OSNR) and having a number of repeaters the method comprising the steps of:
    calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has only one optical fibre;
    calculating the corresponding capacity $C_{01}=B\cdot\log_2(1+SNR_{01})$ of the single spatial channel, determined by the $SNR_{01}$ and a total capacity $C_{Total}=N_{fibre}\cdot C_{01}$ where $N_{fibre}$ is the number of single spatial channels;
    increase the number of optical fibres to $S=m\cdot N_{fibre}$ where S is an integer and m is a number more than 1, such that a repeater spacing $L_{EDFA1}$ of the single spatial channel is related to a repeater spacing $L_{EDFAm}$ of a $S=m\cdot N_{fibre}$ spatial fibre channel, by the following equation:

$$\frac{L_{EDFAm}}{L_{EDFA_1}} \geq m,$$

and such that a signal to noise ratio of the S spatial fibre channels $SNR_{0m}$ is lower than a signal to noise ratio $SNR_{01}$ of the single spatial channel;
    thereby obtaining an increased capacity $C_{increased}=N_{fibre}\cdot m\cdot B\cdot\log_2(1+SNR_{0m})$, wherein the increased capacity depends on m to a stronger degree than on $SNR_{0m}$ by an increased number of fibres S and keeping the number of repeaters to a same or lower value.

The invention claimed is:
1. A method for reducing and/or minimizing the energy consumption and/or the cost of an optical fiber based transmission link characterized by having an optical signal-to-noise-ratio (OSNR) and desired total capacity $C_{Total}$, the method comprising:
    calculating a received signal-to-noise ratio ($SNR_{01}$) in a single spatial channel in the transmission link based on the OSNR of the transmitted optical signal through the link, or assuming a given $SNR_{01}$, as determined by a given link design, wherein the single spatial channel has only one optical fiber;
    calculating the corresponding capacity $C_{01}$ of the single spatial channel, determined by the $SNR_{01}$, and calculating a number of single spatial channels ($N_{fiber}$) required in the link to obtain a predefined desired total capacity $C_{Total}=N_{fiber}\cdot C_{01}$;
    whilst maintaining the same total capacity of the link, distributing the total capacity $C_{Total}$ of the link in $S=m\cdot N_{fiber}$ spatial fiber channels, calculating a required signal-to-noise ratio $SNR_{0m}$ for each of the S spatial fibre channels to support the capacity $C_{Total}/S$, where m is between 1 and 2, or 2, or greater than 2, and wherein S is an integer;
    for each fiber calculating a required repeater spacing in each spatial fibre channel to obtain the required $SNR_{0m}$; and
    determining the number of m that provides the minimum number of repeaters.

2. The method according to claim 1, wherein each of the S spatial fiber channels is independent from each other in such a way that there is no cross-talk from any one of the S spatial fiber channels to any of the other spatial fiber channels and wherein the total capacity of the S independent spatial fiber channels is the sum of the capacities of each of the S independent spatial fiber channels.

3. The method according to claim 1, wherein the total capacity of a fiber link with $N_{fiber}$ single spatial fiber channels is defined as $C_{Total}=N_{fiber}\cdot C_{01}$, where $C_{01}=B\cdot\log_2(1+SNR_{01})$ is the capacity of each single spatial fiber channel, and the same total capacity for the optimized optical fiber based transmission link with S spatial fiber channels is defined as $C_{Total}=N_{fiber} \cdot m \cdot B \cdot \log_2(1+SNR_{0m})$ and, in case of two spatial fiber channels $C_{Total}=N_{fiber} \cdot 2 \cdot B \cdot \log_2(1+SNR_{0m})$, wherein B is the bandwidth of the data signal.

4. The method according to claim 3, wherein $SNR_{0m}$ is related to $SNR_{01}$ according to the following equation $$SNR_{0m} = [1 + SNR_{01}]^{\frac{1}{m}} - 1,$$

wherein $SNR_{0m}$ practically reduces to $$SNR_{0m} \approx \frac{1}{m} \ln[1 + SNR_{01}]$$

for m>=10.

5. The method according to claim 3, wherein $SNR_{01}$ is defined as $$SNR_{01} = \frac{B_{ref}}{R_S} \cdot OSNR_{01},$$

and $SNR_{0m}$ is defined as $$SNR_{0m} = [1 + SNR_{01}]^{\frac{1}{m}} - 1,$$

wherein $B_{ref}$ is a reference bandwidth, $R_S$ is the symbol rate, and $OSNR_{01}$ is the optical signal to noise ratio of the single spatial channel.

6. The method according to claim 3, wherein $SNR_{01}$ is defined as $$SNR_{01} = \frac{B_{ref}}{R_s} \frac{P_{launch}}{\left(\frac{1}{2}\right)\left[\frac{P_{launch}}{OCNR_{laser}}\right] + 2n_{sp}h\upsilon B_{ref}K_{link}(G_{link}-1)},$$

wherein $P_{launch}$ is the power launched in the fiber, $OCNR_{laser}$ is the optical carrier to noise ratio of the transmission laser, $n_{sp}$ is the spontaneous emission factor of the optical amplifiers in the link, h is Planck's constant, $\upsilon$ is the optical frequency, $K_{link}$ is the number of repeaters, $G_{link}$ is the gain of the optical amplifiers, within each repeater, used to exactly compensate for the transmission loss within the repeater spacing.

7. The method according to claim 3, wherein the transmission loss $G_{link}$ is defined as $G_{link}=10^{-\alpha_{dB}L_{EDFA}/10}$, wherein $L_{EDFA}$ is the repeater spacing and $\alpha dB$ is the fiber transmission loss per kilometer in dBs.

8. The method according to claim 3, wherein $L_{tot}$ is the total length of the fiber based transmission link, and wherein $K_{link,m}=L_{tot}/L_{EDFA,m}$ is the number of repeaters for the fiber based transmission link with S spatial fiber channels, $K_{link1}=L_{tot}/L_{EDFA1}$ is the number of repeaters for the fiber based transmission link with one fiber channel (single spatial fiber channel), $L_{EDFAm}$ is the repeater spacing for the fiber based transmission link with m spatial fiber channels and $L_{EDFA1}$ is the repeater spacing for the fiber based transmission link with one fiber channel and wherein $K_{linkm}/K_{link1}=m/(L_{EDFAm}/L_{EDFA1})$ and wherein the following constraint is used to obtain an optimum value of m:

$$\frac{L_{EDFAm}}{L_{EDFA1}} > m.$$

9. The method according to claim 1, wherein energy and/or cost reduction and optimization are achieved by reducing and minimizing the total number of repeaters on the optical fiber based transmission link.

10. The method according to claim 1, wherein energy and/or cost reduction and optimization are achieved by maximizing the total length of the repeaterless optical fiber based transmission link, and wherein the $SNR_{0m}$ is less than the $SNR_{01}$.

* * * * *